(12) United States Patent
Legerton et al.

(10) Patent No.: US 8,113,652 B2
(45) Date of Patent: Feb. 14, 2012

(54) CONTACT LENS WITH MERIDIONAL SAGITTAL VARIATION AND METHODS FOR MAKING AND USING THE SAME

(75) Inventors: Jerome A. Legerton, San Diego, CA (US); William E. Meyers, Scottsdale, AZ (US)

(73) Assignee: CRT Technology, Inc., Mesa, AZ (US)

( * ) Notice: Subject to any disclaimer, the term of this patent is extended or adjusted under 35 U.S.C. 154(b) by 355 days.

(21) Appl. No.: 12/413,319

(22) Filed: Mar. 27, 2009

(65) Prior Publication Data

US 2010/0245759 A1 Sep. 30, 2010

(51) Int. Cl.
*G02C 7/04* (2006.01)
(52) U.S. Cl. .................. 351/160 H; 351/160 R; 351/177
(58) Field of Classification Search .............. 351/160 R, 351/160 H, 161, 162, 177
See application file for complete search history.

(56) References Cited

U.S. PATENT DOCUMENTS

| | | | |
|---|---|---|---|
| 5,502,518 A | 3/1996 | Lieberman | |
| 5,570,142 A | 10/1996 | Lieberman | |
| 5,650,837 A | 7/1997 | Roffman et al. | |
| 5,796,462 A | 8/1998 | Roffman et al. | |
| 5,835,192 A | 11/1998 | Roffman et al. | |
| 5,880,809 A | 3/1999 | Lieberman et al. | |
| 5,953,098 A | 9/1999 | Lieberman et al. | |
| 6,241,355 B1 | 6/2001 | Barsky | |
| 6,250,757 B1 | 6/2001 | Roffman et al. | |
| 6,305,802 B1 | 10/2001 | Roffman et al. | |
| 6,340,229 B1 | 1/2002 | Lieberman et al. | |
| 6,467,903 B1 | 10/2002 | Back | |
| 6,491,392 B2 | 12/2002 | Roffman et al. | |
| 6,511,179 B1 | 1/2003 | Davis et al. | |
| 6,857,740 B2 | 2/2005 | Back | |
| 6,971,746 B2 | 12/2005 | Back | |
| 7,004,584 B1 | 2/2006 | Meyers et al. | |
| 7,018,039 B2 | 3/2006 | Legerton et al. | |
| 7,040,755 B2 | 5/2006 | Legerton et al. | |
| 7,133,174 B2 | 11/2006 | Back | |
| 7,134,753 B2 | 11/2006 | Back | |
| 7,152,975 B2 | 12/2006 | Ho et al. | |
| 7,216,974 B2 | 5/2007 | Meyers et al. | |
| 7,270,412 B2 | 9/2007 | Legerton et al. | |
| 7,338,160 B2 | 3/2008 | Lieberman et al. | |
| 7,360,890 B2 | 4/2008 | Back | |
| 2003/0086055 A1 | 5/2003 | Morris et al. | |

(Continued)

FOREIGN PATENT DOCUMENTS

WO 2006086839 8/2006
WO 2008014544 2/2008

OTHER PUBLICATIONS

International Search Report and the Written Opinion dated May 21, 2010 for PCT/US2010/028708.

(Continued)

*Primary Examiner* — Scott J Sugarman
(74) *Attorney, Agent, or Firm* — Snell & Wilmer, L.L.P.

(57) ABSTRACT

The present invention is directed toward the design of lenses to incorporate elevation features in at least one annular zone on the posterior surface of the lens that engage the elevation differences of the eye while allowing the central zone of the lens to have conventional spherical, aspheric, multifocal or toric geometry. In various embodiments, lenses according to the present invention are rotationally stable, free of flexure and well centered over the pupil.

19 Claims, 5 Drawing Sheets

U.S. PATENT DOCUMENTS

| | | |
|---|---|---|
| 2007/0013869 A1 | 1/2007 | Dahi et al. |
| 2007/0242216 A1 | 10/2007 | Dootjes et al. |
| 2008/0030676 A1 | 2/2008 | Back |
| 2008/0123048 A1 | 5/2008 | Volk |
| 2009/0009712 A1 | 1/2009 | Back |

OTHER PUBLICATIONS

International Preliminary Report on Patentability dated Jul. 5, 2011 for International Application No. PCT/US2010/28708.

CONTACT LENS WITH MERIDIONAL SAGITTAL VARIATION AND METHODS FOR MAKING AND USING THE SAME

FIELD OF INVENTION

The present invention relates to contact lenses, and more specifically, to contact lenses configured to improve or facilitate rotational stability, reduce flexure and/or improve lens centration.

BACKGROUND OF THE INVENTION

Contact lenses have been manufactured and broadly distributed for decades. Some contact lens designs, including those to correct for astigmatism, required that a respective proportion of lenses incorporated features to provide for rotational stability. Such features have been described in the prior art as prism ballasting, double slab off, and anterior thickness variations, among other means.

Additionally, flexure of rigid, soft, and hybrid lenses can be a problem that results in induced astigmatism and aberrations that reduce the ability of the lenses intended to correct refractive errors. Flexure is reported to be most common in rigid, soft, and hybrid lenses in the presence of corneal astigmatism where the vertical corneal meridian has a shorter radius of curvature than the horizontal meridian. One cause of the flexure is the force of the upper lid on the superior portion of the lens thereby causing the lens to shorten in radius in the vertical meridian.

Contact lenses are also known to fail to center over the pupil or visual axis. For example, the forces of mass-gravity and lid interaction interact with the lens-eye relationship may cause the lens to fail to center. Additionally, differences in the posterior lens surface geometry and the anterior corneal and/or scleral geometry may also contribute to the failure of lenses to center. Various prior art addresses the failure to center by displacing the optics of lenses to account for the failure of the lenses to center.

Generally, neither the cornea nor the sclera of an eye is perfectly spherical and a given semi-meridian will often spatially differ from both the alternate semi-meridian of the same meridian, and adjacent semi-meridians. Contact lenses in the prior art are deficient because they do not account for at least some of such aberrations.

The advancement of computer assisted videokeratography provide eye care practitioners with corneal topographic elevation data that may be used to construct lenses that have features on the posterior surface that aid in the rotational stability of lenses, the reduction of flexure of contact lenses and improved centration and rotational stability of contact lenses.

However, attempts to manufacture custom contact lenses that more closely match corneal and/or scleral elevation differences have deficiencies. These lenses have received limited use due to an unintended misalignment of the lens and the corneal and/or scleral surface caused by lid interaction and gravitational forces. The inability to achieve a proper lens fit may also cause higher order aberrations that reduce the visual acuity of the wearer.

Prior art lenses that have attempted to engage one or more elevations of the cornea and/or sclera are deficient in several other respects. For example, prior art lenses do not take into account that notwithstanding corneal and/or scleral aberrations, the limbal junction is substantially circular, planar, and untilted. In contrast, prior art lenses may comprise a periphery that is either circular or planar, but not both. This deficiency can be attributed to the concept that a cut along a single plane of a prior art lens which matches the elevations of the surface of the eye results in a lens having a planar periphery, but not a circular periphery. Similarly, a prior art lens which matches the elevations of the surface of the eye cut to provide a circular periphery does not have a planar periphery. Prior art lenses do not take into account that elevation differences are predominantly outside of the zone of the cornea that contributes to the refractive error of the eye. Prior art lenses also are subject to lens lid interactions.

Accordingly, there exists a need for a contact lens that overcomes these and other shortcomings in the prior art.

SUMMARY OF THE INVENTION

In exemplary embodiments, the present invention provides lens structures that assist rotational stability, reduce flexure and improve lens centration without suffering the problems of the improper or inadequate lens fit.

In exemplary embodiments, the present invention provides for a contact lens, the posterior portion of which is at least partially configured to spatially match one or more elevations of the cornea and/or sclera, having a perimeter that is both substantially circular and substantially planar, and/or which may correspond to the region near the limbal junction. In an exemplary embodiment, the lens comprises a central portion that does not spatially match the topography of the cornea but is independently configured, for example, to have a conventional spherical, aspheric, multifocal or toric geometry. In an exemplary embodiment, the anterior surface of the lens is independent of the underlying posterior surface so as to minimize lens lid interactions. Also disclosed herein are methods of making and fitting lenses in accordance with the present invention.

BRIEF DESCRIPTION OF THE DRAWINGS

The exemplary embodiments of the present invention will be described in conjunction with the appended drawing figures in which like numerals denote like elements and.

DETAILED DESCRIPTION

Figure 1:
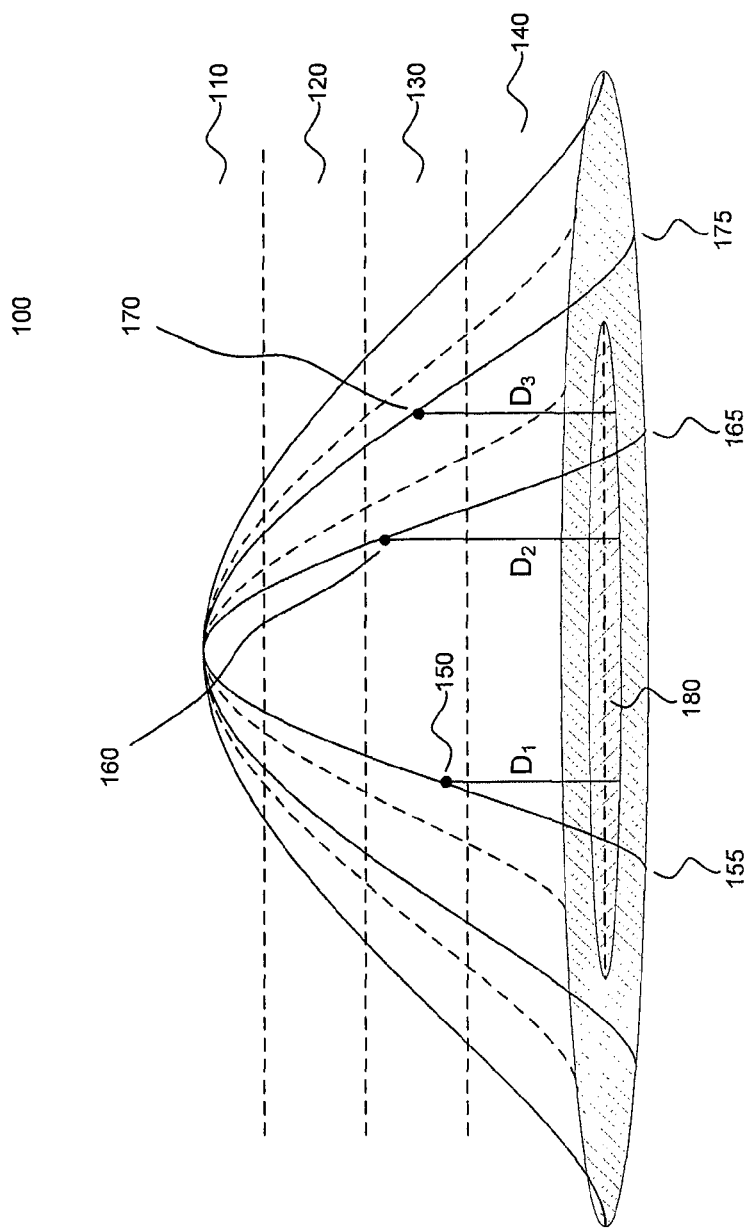
FIG. 1 is a transparent view of a contact lens showing semi-meridians having varying sagittal depths at a chord diameter.

The present invention relates to a contact lens structure that, among other advantages, facilitates or provides better rotational stability, reduces flexure and/or improves lens centration. One skilled in the art will appreciate that various aspects of the invention may be realized by any number of materials or methods configured to perform the intended functions. For example, other materials or methods may be incorporated herein to assist rotational stability, reduce flexure and/or improve lens centration. It should also be noted that the drawings herein are not all drawn to scale, but may be exaggerated to illustrate various aspects of the invention, and in that regard, the drawings should not be limiting.

A lens in accordance with the present invention may be made of any suitable contact lens material and may be configured as either a "rigid," "soft" or "hybrid" lens. For example, an exemplary hybrid lens comprises a rigid central zone and a soft annular and/or edge reconciliation zone. In accordance with exemplary embodiments, the lens is comprised of one or more of fluorosilicon acrylate, silicon acrylate, polymethylmethacrylate, a silicon hydrogel, or another suitable material. In general, any gas permeable, biocompatible material is suitable for use herein.

An exemplary lens may be used with humans or animals, having corneas of varying diameters. In some embodiments, the lens has a diameter smaller than the visible iris diameter, while in some embodiments, for example, in so called scleral contact lenses, the lens has a diameter larger than the visible iris diameter. In exemplary embodiments, the diameter of the lens is between about 7 mm and about 24 mm, and generally the diameter of the lens is between about 9.5 mm and about 18 mm. One skilled in the art will appreciate that a lens diameter according to the present invention may be much larger or smaller, depending on the intended purpose and the size of the cornea, and in some embodiments, the sclera, to be fitted with the lens.

A lens in accordance with the present invention may have any suitable cross-sectional thickness and, as will be discussed, the cross-sectional thickness may vary across the surface of the lens. In exemplary embodiments, the cross-sectional thickness ranges from about 0.05 to about 0.5 mm. One skilled in the art will appreciate that a lens cross-sectional thickness according to the present invention may be much thinner or thicker.

An exemplary lens may be materially and/or structurally configured for daytime use only, nighttime use only, or 24 hour use for a single day or a plurality of days.

The present invention relates to contact lenses, whether to correct refractive errors, for a corneal reshaping program, or for other uses. In general, an exemplary lens in accordance with the present invention comprises a central zone, at least one annular zone, and an edge reconciliation zone. A lens in accordance with the present invention further comprises an anterior surface and a posterior surface. "Anterior surface" refers to the surface meant to contact an eyelid, and "posterior surface" refers to the surface meant to contact a cornea, and in some embodiments, a sclera, or other portion of the eye.

In accordance with exemplary embodiments, the central zone is generally concentric with and comprises the center of the lens. In exemplary embodiments, the central zone is configured to have a conventional spherical geometry and has a diameter comparable to the visible pupil diameter, for example, from about 2 to about 10 mm, and generally, from about 3.5 to about 8.5 mm. In various exemplary embodiments, the central zone may be configured to have a conventional aspheric, multifocal or toric geometry.

In various exemplary embodiments, the central zone has a posterior surface having a curvature determined by the correction or reshaping to be imparted to the cornea or based upon other desirable properties and/or effects. For example, an exemplary lens comprises a central zone configured to correct an intended refractive error. The radius of curvature of the central zone may be chosen based upon characteristics of an eye for which the lens is being designed, and particularly related to the amount of correction required. In various exemplary embodiments, the central zone may be flatter than the radius of curvature of the cornea.

In exemplary embodiments, the central zone is configured independent from the annular zone(s). In accordance with exemplary embodiments, the posterior surface of the central zone need not be configured to spatially match the topography of the cornea, while in other exemplary embodiments, the posterior surface of the central zone indeed may be configured to completely or partially spatially match the topography of the cornea.

As one skilled in the art will appreciate, a study of elevation data from computer assisted videokeratography and optical coherence tomography reveals symmetrical and asymmetrical elevation points on the cornea and sclera of an eye. Such elevation disparity is even noted on eyes that are otherwise deemed as "normal" and without corneal astigmatism. For example, one pattern that has been observed is that of lower elevation in the vertical meridian of the eye at a chord diameter of 8 mm than is found in the horizontal meridian of the eye at a chord diameter of 8 mm.

The inventors have also observed a trend for the nasal semi-meridian to be higher in elevation than the corresponding temporal semi-meridian at a chord diameter of 8 mm. Optical Coherence Tomography reveals a difference in the local slope and elevation of the sclera at a chord diameter of 13 mm when studied circumferentially.

These elevation differences are generally outside of the zone of the cornea that contributes to the refractive error of the eye and yet contribute to the ability to fit contact lenses that are rotationally stable, free of flexure and/or well centered over the pupil.

Thus, as noted above, a lens in accordance with the present invention comprises at least one annular zone. In accordance with exemplary embodiments, an annular zone is a generally "donut" or ring shaped portion of the lens, overlying the cornea and/or sclera. In some embodiments, an exemplary annular zone comprises a posterior surface configured to at least partially spatially engage or match one or more elevation differences or other geometric diversity on the cornea and/or sclera. In other embodiments, as described in greater detail below, an exemplary annular zone does not spatially engage or match one or more elevation differences on the cornea and/or sclera. Stated another way, in some embodiments, the annular zone "vaults" the cornea.

An exemplary annular zone surrounds the central zone and is generally concentric therewith. In the case of an exemplary lens having only a single annular zone, the annular zone has an inner circumference diameter equal to, or slightly larger than, the diameter of the central zone, and an outer circumference diameter equal to, or slightly smaller than, the diameter of the edge reconciliation zone.

Of course, one skilled in the art will appreciate that any number of annular zones may be located between the central zone and the edge reconciliation zone, for example, 1, 2, 3, 4, 5, 6, or more. In exemplary embodiment, the width of an annular zone ranges from between about 0.2 mm to about 6.5 mm.

The radial transition from the central zone to an annular zone, from a first annular zone to a second annular zone, or from an annular zone to the edge reconciliation zone may be "smooth" or "gradual." For example, a smooth or gradual radial transition may be defined by a sigmoid, a third order polynomial, or a conic constant. In exemplary embodiments, the anterior and/or posterior lens surface (including one or more of the central zone, the annular zone(s), and the edge reconciliation zone) is defined by a single mathematical equation or expression, such that the radial transitions between zones lack sharp changes in contour or "corners." In exemplary embodiments, a smooth or gradual radial transition is desirable to minimize the forces of lid interaction and/or better conform to the surface of the cornea, sclera, or other portion of the eye. Alternatively, the radial transition may be uncurved and defined by an angle.

As noted above, exemplary lens embodiments comprise an annular zone configured to at least partially spatially match the topography of the cornea and/or sclera. In accordance with exemplary embodiments, the posterior surface semi-meridians within an annular zone vary radially from each other to at least partially conform to symmetrical and asymmetrical elevation points on the cornea and/or sclera of an eye. The radial transition along a given semi-meridian within an annular zone may be defined by a sigmoid, a third order polynomial, a conic constant, or is uncurved and defined by an angle. In an exemplary embodiment, the radial transition partially or substantially conforms to one or more elevation features of the underlying cornea and/or sclera. In another exemplary embodiment, the radial transition does not conform to one or more elevation features of the underlying cornea and/or sclera.

As will be described in greater detail below, in addition to defined semi-meridional radial transitions, defined rotational transitions between semi-meridians further provide for an intended lens fit, which may or may not comprise engaging one or more elevation features of the underlying cornea and/or sclera.

In an exemplary embodiment, it is advantageous to design a lens that only engages one or a select few of the larger or more common elevation features of the underlying cornea and/or sclera, for example, to achieve better lens stability, reduce flexure, and encourage centration. Of course, one skilled in the art will appreciate that while such radial meridional and rotational transitions may be at least partially determined by the elevation of the underlying cornea and/or sclera, such transitions may additionally or alternatively be determined by a number of other useful and desired design characteristics.

FIG. 1 illustrates an exemplary embodiment of a lens 100 comprising a central zone 110, a first annular zone 120, a second annular zone 130, and an edge reconciliation zone 140. As shown, the sagittal depth $D_1$ of a first point 150 along a first posterior semi-meridian 155 located within second annular zone 130 at a chord diameter 180 is different from the sagittal depth $D_2$ of a second point 160 along a second posterior semi-meridian 165 located within second annular zone 130 at chord diameter 180 and is different from the sagittal depth $D_3$ of a third point 170 along a third posterior semi-meridian 175 located within second annular zone 130 at chord diameter 180. As used herein, sagittal depth is the depth measured from a particular point on the posterior surface of a lens to a plane along the perimeter of the lens.

While actual meridional sagittal variation will vary from eye to eye and lens to lens, meridional sagittal variation on the order of less than about 20 microns, and in some embodiments, less than about 5 microns may be engaged by a lens, or stated differently, matched by the meridional sagittal variation of a lens, in accordance with the present invention.

The meridional sagittal variations may or may not conform to the features of the underlying cornea and/or sclera. For example, in some embodiments, the meridional sagittal variations do engage elevation aberrations and the result is a lens with better lens self orientation and rotational stability, the reduction of flexure of contact lenses and improved centration of lenses on the eye.

In exemplary embodiments, for example, those shown in FIGS. 2A-2D, a semi-meridian radial transition spatially differs from both the alternate semi-meridian of the same meridian, and adjacent semi-meridians. In exemplary embodiments, the spatial difference is at least partially determined by the topography of the underlying cornea and/or sclera. In other embodiments, the spatial difference is attributed to a corneal reshaping program.

Figure 2B:
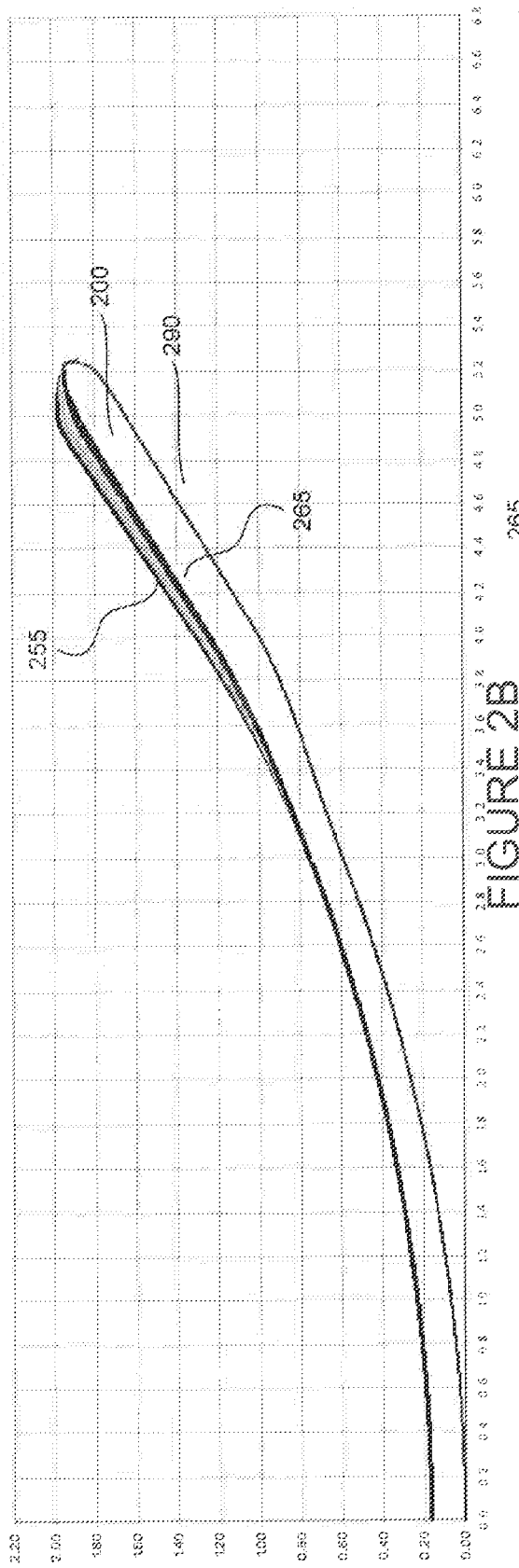
FIG. 2B illustrates two semi-meridians of the lens from FIGS. 2A, and 24 intermediate semi-meridians, superimposed on one another.
Figure 2A:
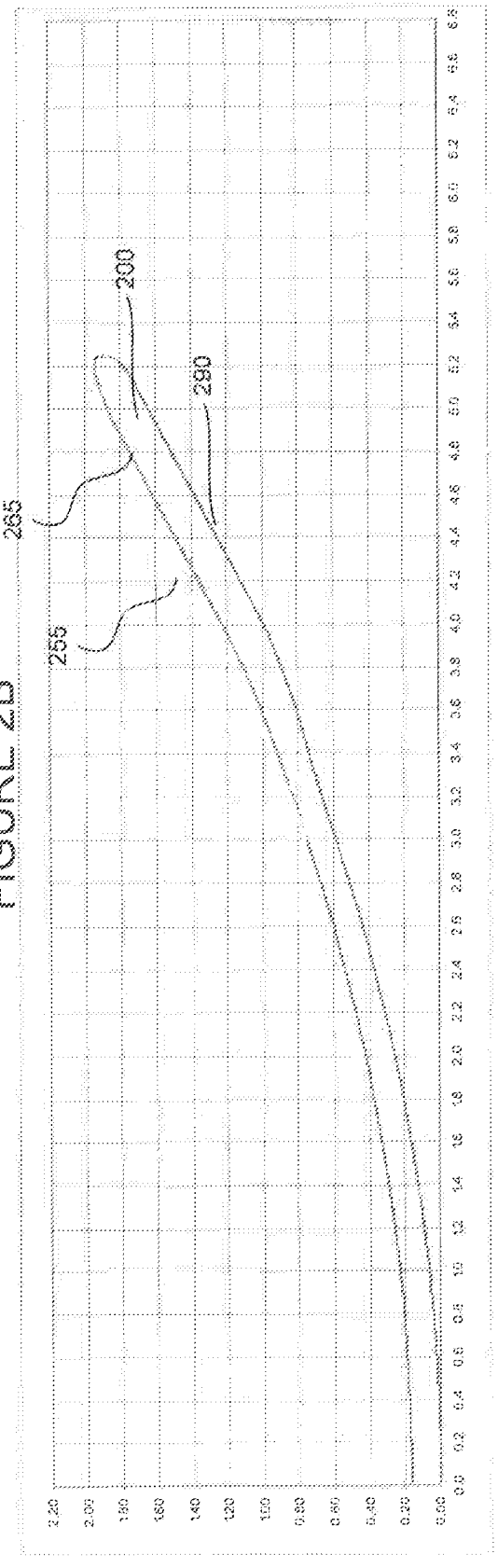
FIG. 2A illustrates two semi-meridians of a lens superimposed on one another.

FIG. 2A illustrates two alternate posterior semi-meridians 255 and 265 of an exemplary lens 200 superimposed on one another. Also shown are coinciding anterior semi-meridians, collectively labeled as reference numeral 290. Lens 200 has three return zone depths ("RZD") (~75 microns) deeper and two angles (~30 microns) deeper in the alternate meridian. From about 3 mm to about 4 mm the RZD depth grows faster in meridian 255, and from about 4 mm to near 5 mm the landing zone angle ("LZA") (i.e., the uncurved conical portion) further deviates from meridian 265. At the edge of lens 200, from near 5 mm to near 5.2 mm, meridian 255 rises to meet the depth of meridian 265. Though FIG. 2B appears to have the deviation between semi-meridians 255 and 265 filled, it actually is a superimposition of 24 intermediate meridians leaving very little space on the drawing between semi-meridians 255 and 265. The rotational transition between semi-meridians 255 and 265, as described in greater detail below, may be linear or otherwise uncurved and defined by an angle, or may be defined by a third order polynomial and/or a conic constant.

Figures 2C, 2D:
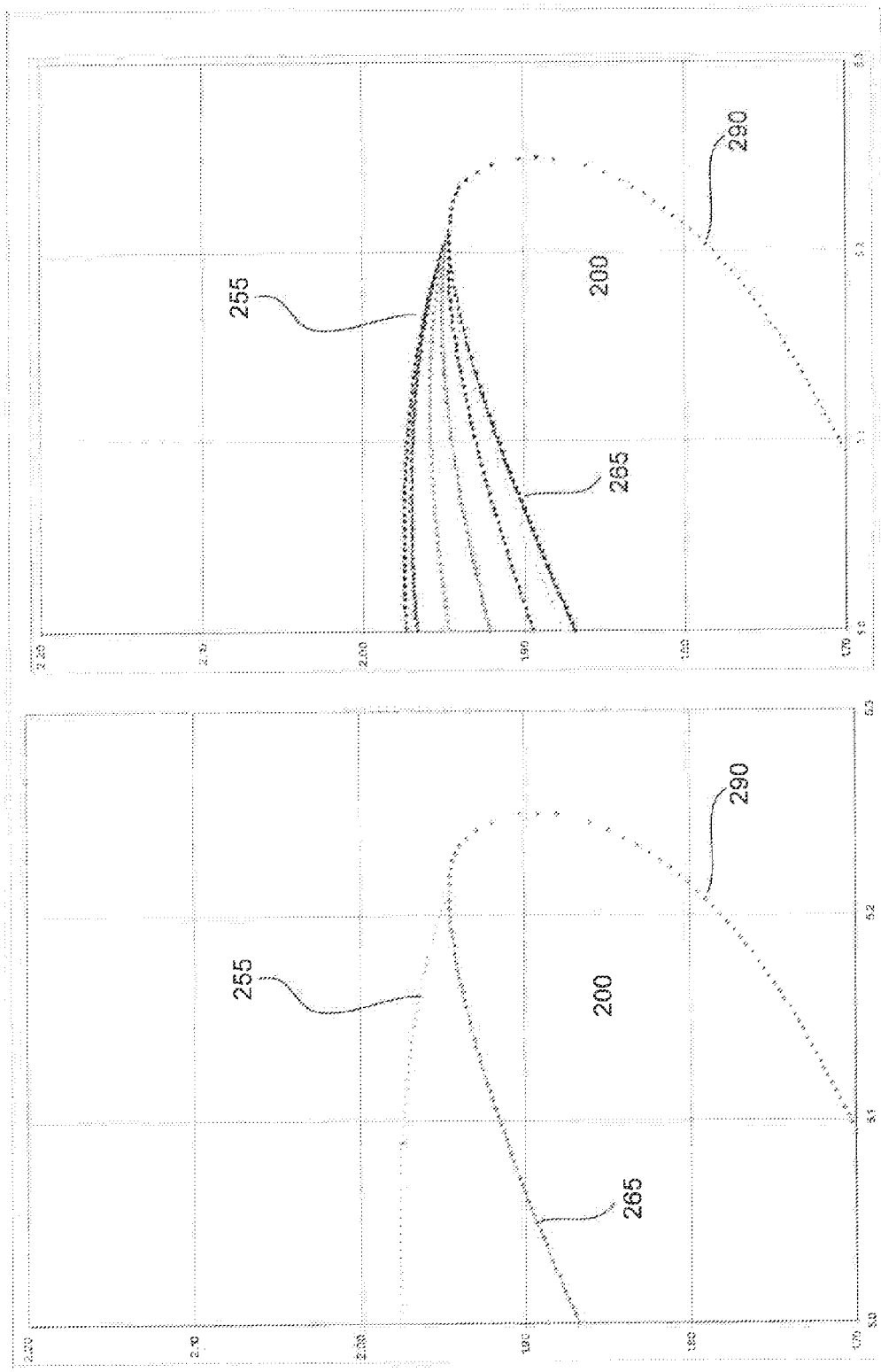
FIG. 2C illustrates a close up of the tip of the lens from FIG. 2A.
FIG. 2D illustrates a close up of the tip of the lens from FIG. 2B.

FIG. 2C illustrates a close up of the tip of lens 200 from FIG. 2A, and similarly, FIG. 2D illustrates a close up of the tip of lens 200 from FIG. 2B, both of which illustrate how the lens perimeter, in accordance with exemplary embodiments discussed below, is planar, regardless of the curvature changes in the one or more annular zones.

In some embodiments, the anterior surface of the lens (referring to one or more of the central zone, the annular zone(s), and the edge reconciliation zone) is designed to mirror or be substantially the same shape as the posterior or back surface.

However, in other exemplary embodiments, the anterior surface of the lens is designed to partially mirror the posterior and partially not mirror the posterior—in other words, designed to partially mirror and be partially regular.

When referring to an anterior lens surface, the term "regular" means substantially without aberrations, spherical, spatially symmetric, similar to the geometry of standard contact lenses, or otherwise materially and/or structurally configured so as to minimize lens lid interactions.

Still, in other embodiments, the anterior surface of the lens is independent of the underlying posterior surface, and may be configured to minimize lens lid interactions, which can in turn, lead to improper or inadequate lens orientation and rotational instability, increase of flexure of contact lenses, and unsuccessful centration.

For example, the posterior lens surface may be at least partially configured to spatially match the topography of the eye, while the anterior lens surface (including one or more of the central zone, the annular zone(s), and the edge reconciliation zone) may be regular, as shown for example, by reference numeral 290 in FIGS. 2A-2D. Stated differently, in accordance with an exemplary embodiment, a lens is comprised of a regular anterior surface, and the thickness of the lens varies within an annular zone, with the varying lens thickness at least partially conforming to the varying corneal and/or scleral elevations underlying the annular zone.

In accordance with various embodiments, any suitable number of defined semi-meridians across the surface of an exemplary lens may have an independent radial profile or transition. Stated differently, one or a plurality of semi-meridians may be different from the others, for example, 2, 4, 6, 12, 18, 24, 36, or more. The number of defined semi-meridians in some embodiments depends on the corneal and/or scleral elevation aberrations and intended purpose of the lens, whether to correct refractive errors, or provide clearance from diseased tissue, create a desired post lens tear film volume or exchange or for a corneal reshaping program.

Figure 3:
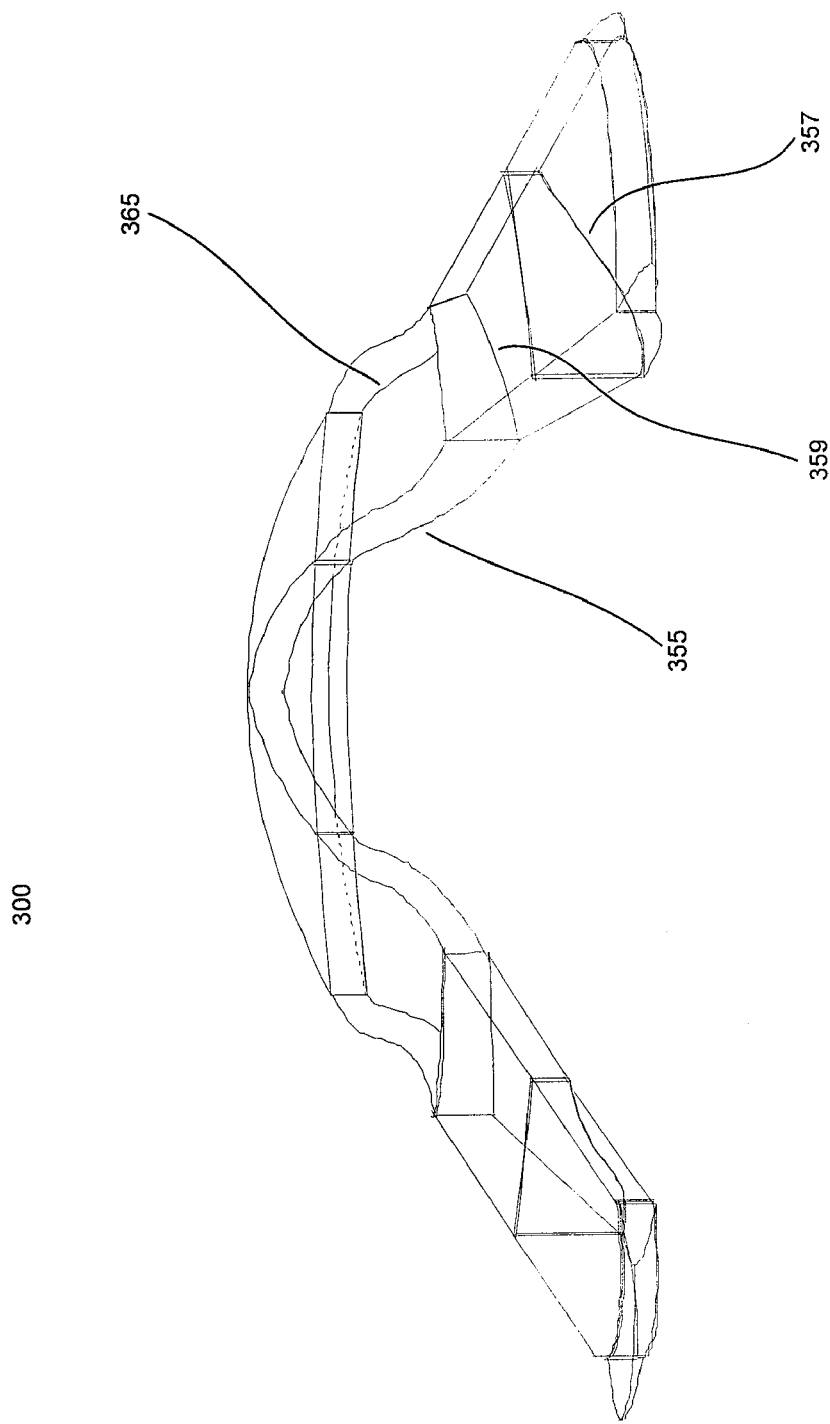
FIG. 3 is a three dimensional view of two pie sections of a lens in accordance with an exemplary embodiment.

As shown on an exemplary lens 300 in FIG. 3, a rotational transition 357 from a first posterior semi-meridian 355 to a second posterior semi-meridian 365 may be defined by a third order polynomial, a conic constant, or is uncurved and defined by an angle. Moreover, the rotational transition from first posterior semi-meridian 355 to second posterior semi-meridian 365 may vary radially, as illustrated by the difference between rotational transitions 357 and 359 in FIG. 3.

In accordance with exemplary embodiments, an annular zone only partially corresponds to the elevations of the cornea and/or sclera. For instance, in an exemplary embodiment, an annular zone engages corneal aberrations along the nasal semi-meridian at or around a chord diameter of 8 mm. In another exemplary embodiment, an annular zone engages corneal aberrations along the corresponding temporal semi-meridian at or around a chord diameter of 8 mm.

While an annular zone may be completely or partially configured to spatially engage or match one or more elevation differences on the cornea and/or sclera, in exemplary embodiments, a lens comprises one or a plurality of annular zones, at least one of which is not configured to spatially match the topography of the eye.

In one embodiment, an annular zone may be designed for use in a corneal refractive therapy ("CRT"), orthokeratology ("ortho-K"), or other corneal reshaping program.

In yet other embodiments, for example, in scleral contact lenses according to the present invention, an exemplary annular zone vaults the cornea or otherwise provides a space between the cornea and the lens to reduce lens flexure or bring about another intended outcome.

In another embodiment, an annular zone is configured with one or more posterior curves, undulations or other aberrations along one or more meridians that may or may not extend all the way to the central zone to prevent sealing of the lens to the eye.

In yet another embodiment, an annular zone is configured to adjust the sagittal depth to a desired amount such that the lens can either lightly touch the cornea under the central zone or can be suspended a desired amount above the cornea.

In exemplary embodiments, a lens in accordance with the present invention comprises an edge reconciliation zone. In exemplary embodiments, the edge reconciliation zone is configured to transition from the annular zone(s) and further comprises an edge contour zone (i.e., the perimeter of the lens). In general, the limbal junction is substantially circular, planar, and untilted. In some embodiments, the edge reconciliation zone conforms to the region near the limbal junction. In one embodiment, the contact lens posterior meridians converge to yield a spatially symmetric edge, for example, an edge which is substantially circular, planar and untilted. In accordance with exemplary embodiments, notwithstanding the curvature changes in the one or more annular zones, the lens returns to at least one of circular, planar, and untilted at its perimeter. Such return may thereby reduce conjunctival pressure and/or conjunctival epithelial flap occurrence, as well as provide benefits such as improved circulation and exchange of the post lens tear film, and improved regulation of the edge lift circumferentially. Such return may also minimize lid interaction and/or minimize leverage for lens flexure and distortion.

As used herein, a lens returning to "circular" at its perimeter (i.e., its edge) means the lens has a substantially round or circular outer circumference. As used herein, a lens returning to "planar" at its perimeter means the lens has an outer circumference that lies within a single plane. As used herein, a lens returning to "untilted" at its perimeter means the lens is designed for the outer circumference of the lens to be parallel with the user's pupil.

Figure 4:
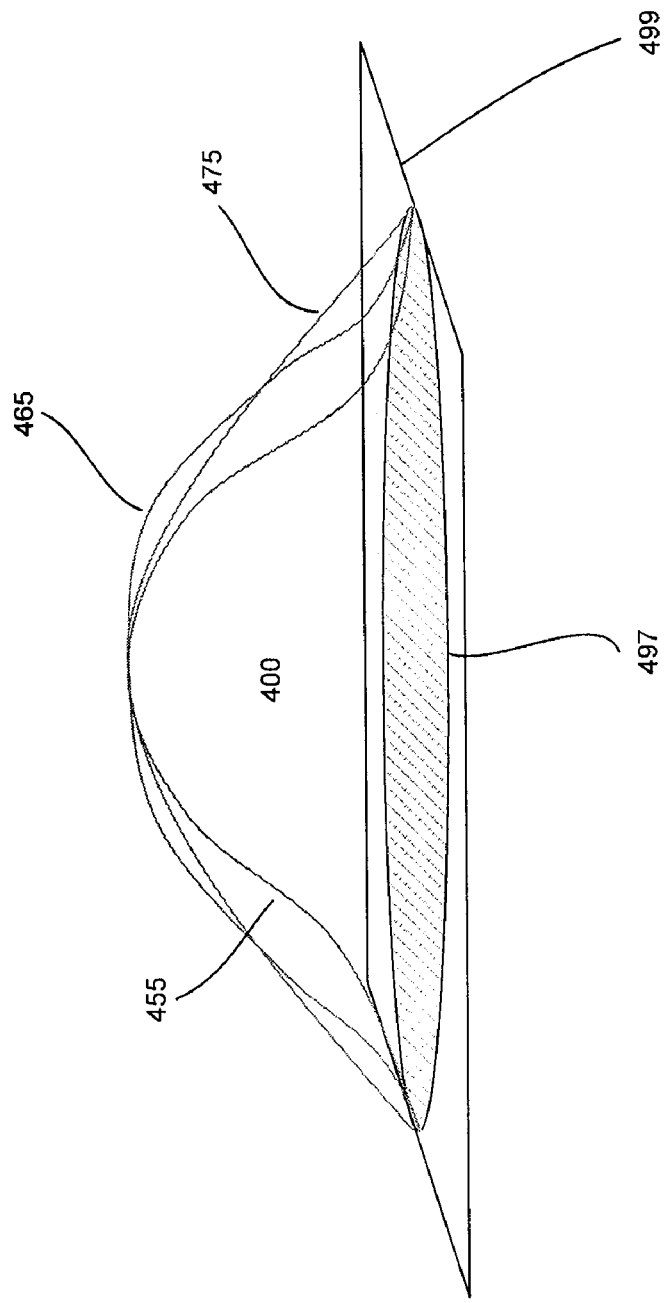
FIG. 4 illustrates the perimeter of the edge reconciliation zone of a lens in accordance with an exemplary embodiment.

FIG. 4 illustrates three posterior meridians 455, 465, and 475 of an exemplary lens 400 superimposed on one another, each having a different spatial profile. In exemplary embodiments, the spatial difference is at least partially determined by elevation variations of the underlying cornea. In other embodiments, the spatial difference is attributed to a corneal reshaping program. And in yet other embodiments, the spatial difference is determined by other useful and desired design characteristics.

In one embodiment, each end of meridians 455, 465, and 475 ends along a circumference 497 such that the perimeter of the edge reconciliation zone is circular, regardless of the curvature changes in the one or more annular zones.

In one embodiment, each end of meridians 455, 465, and 475 ends on a plane 499 such that the perimeter of the edge reconciliation zone is planar, regardless of the curvature changes in the one or more annular zones.

In one embodiment, each end of meridians 455, 465, and 475 ends along a circumference 497 and on a plane 499 such that the perimeter of the edge reconciliation zone is circular and planar, regardless of the curvature changes in the one or more annular zones.

In one embodiment, an exemplary contact lens has substantially the same thickness about the perimeter, regardless of the curvature changes in the one or more annular zones.

In yet another embodiment, an exemplary lens has a varying thickness about the perimeter. For example, an exemplary lens is planar and has a varying thickness about the perimeter such that the lens perimeter undulates but is in complete circumferential contact with the cornea or sclera, as appropriate.

Notwithstanding the foregoing, in accordance with some exemplary embodiments, the lens does not return to exactly circular, planar, or untilted at its perimeter. For example, the edge of the lens may vary or undulate to prevent sealing of the lens to the eye or promote oxygen exchange across the surface of the cornea or sclera. In an exemplary embodiment, the edge of the lens is in a waffle pattern similar to the edge of a clam (scallop) shell. In an exemplary embodiment, the lens does not return to exactly circular, planar, or untilted at its perimeter in the case of a lens having an edge reconciliation zone extending beyond the region near the limbal junction. In some embodiments, the lens perimeter is substantially circular and planar and has only a portion of the lens perimeter designed to vary or undulate.

In exemplary embodiments, the edge of the lens is further configured to reduce conjunctival pressure and/or conjunctival epithelial flap occurrence. For example, the edge of the lens may be rounded. In exemplary embodiments, the edge of the lens is configured to minimize lens edge standoff.

Having described in detail the various zones of exemplary lenses in accordance with various embodiments of the present invention, an exemplary lens comprises a central portion, a first annular zone in a sigmoid shape at least partially conforming to the surface of the cornea and/or sclera, a second flat or uncurved annular zone at least partially conforming to the surface of the cornea and/or sclera, and an edge reconciliation zone having a circular and planar perimeter.

In the case of a lens conformed to a diameter of less than the visible iris diameter, the central zone may have a diameter of between about 4 mm and about 8 mm, a first annular zone may have a diameter of between about 0.5 mm and about 2.0 mm, and a second, uncurved annular zone may have a diameter of between about 0.5 mm and about 2.0 mm.

In the case of a lens conformed to a diameter of greater than the visible iris diameter, the central zone may have a diameter of between about 4 mm and about 12 mm, a first annular zone may have a diameter of between about 0.5 mm and about 4.0 mm, and a second, uncurved annular zone may have a diameter of between about 0.5 mm and about 4.0 mm.

In exemplary embodiments, a method of making a lens in accordance with the present invention comprises fitting a lens by obtaining corneal and/or scleral elevation data from computer assisted videokeratography and optical coherence tomography, wherein one or more annular zones are identified that have a sagittal elevation difference between at least two points located the same radial distance from the center axis of the lens. In accordance with one aspect of various exemplary embodiments, a method of fitting a lens in accordance with the present invention comprises identifying an elevation difference of at least about 5 microns, and in some embodiments, at least about 20 microns.

In some embodiments, lenses in accordance with the present invention are manufactured for a user prior to the user's eye being subject to computer assisted videokeratography and optical coherence tomography. For example, lenses in accordance with the present invention may be manufactured based merely upon commonly observed corneal or scleral elevation differences or other aberrations. In accordance with an aspect of an exemplary embodiment, a plurality of geometrically distinct lenses are included in a kit for lens fitment by a practitioner, as described below.

An exemplary method of making a lens in accordance with the present invention comprises selecting the radius of curvature of a central zone based upon corneal elevation data or other characteristics of an eye for which the lens is being designed. To determine the refractive error of an eye, typical refractive and/or keratometry measurements may be used. Using a keratometer, a single point value for the radius of curvature at the apex of the cornea may be measured.

An exemplary method of making a lens in accordance with the present invention further comprises applying spline mathematics or other curve fitting methods to some or all of the corneal and/or scleral elevation data to define an anterior and/or posterior lens surface comprised of a plurality of lens radial meridional transitions and at least one rotational transition between the plurality of lens radial meridional transitions.

In accordance with exemplary embodiments, the edge reconciliation zone may be comprised of meridians modified by any mathematical means of smoothly diminishing the difference between the edge sagittal depth location at full diameter that would derive by continuation of the curvature of a given meridian passing through the most peripheral zone to the full diameter of the edge in comparison to the edge that would be projected from one selected meridian whose edge sagittal depth location has been chosen to be the common edge.

In exemplary embodiments, the meridian(s) projecting to the common edge are those yielding the least ultimate sagittal depth at the full edge diameter but may in some cases be chosen by other criteria. Such methods of diminishing the difference may be as simple as projecting the difference that would arise in the absence of reconciliation and using a stepwise linear function to gradually eliminate the projected difference over the course of transitioning from the most outer diameter of peripheral zone to a point at or near the full edge diameter where all meridians coincide in sagittal depth to generate a common edge for the lens. Any mathematical means however would suffice and may additionally incorporate terms designed to minimize sharp junctions or to modify the rate of diminishment to control where along the course of transition the most rapid diminishment occurs. Such functions may include polynomials, power series, logarithmic functions or averaging functions among others. Such functions may be applied to each defined meridian as required by the difference of the projected sagittal depth at full diameter for that meridian from the sagittal depth at full diameter of the meridian selected to define the common edge.

In accordance With exemplary embodiments, cutting files for computer numerically controlled lathes are designed to cut a lens from a pre-formed lens button or blank in accordance with the present invention. Polish free lathes are preferred in exemplary embodiments to the extent polishing may soften or obliterate the meridional sagittal variation of the lens.

In an exemplary embodiment, a kit of lenses according to the present invention is provided for use for example, in connection with lens fitment. In another exemplary embodiment, each lens within the kit comprises a different posterior surface profile and/or central zone geometry for use by a practitioner in connection with lens fitment.

Among other things, and in accordance with various lens fitment kit embodiments, a less sophisticated lens surface (e.g., a lens that only engages one or a select few of the larger or more common elevation features of the underlying cornea and/or sclera) helps the fitter succeed in the determination of the successful lens parameters with a minimum of time and equipment along with a reduced number of lens reorders to achieve successful wearing by the patient.

One skilled in the art will appreciate that the various lenses in an exemplary kit may be configured to have outer diameters larger or smaller than the diameter of a patient's cornea.

In another exemplary embodiment, each lens within the kit has a progressively different posterior surface profile and/or central zone geometry to progressively reshape the cornea and/or correct an intended refractive error. In such an embodiment, a user would wear each lens in series to redistribute corneal tissue in a desired manner. In other exemplary embodiments, each lens within the kit has the same posterior surface profile.

The foregoing disclosure is illustrative of the present invention and is not to be construed as limiting the invention. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention, and are not to be construed as limited to the specific embodiments disclosed.

What is claimed is:

1. A contact lens comprising:
a central zone, an annular zone, and an edge reconciliation zone,
wherein the annular zone comprises:
a first point located on the posterior surface of the lens at a chord diameter along a first meridian having a first sagittal depth, and a second point located on the posterior surface of the lens at said chord diameter along a second meridian having a second sagittal depth, wherein said second sagittal depth differs from said first sagittal depth; and wherein a perimeter of the lens lies within a single plane and is circular.

2. A contact lens in accordance with claim 1, wherein the central zone is independently configured to have one of a spherical, aspheric, multifocal or toric geometry.

3. A contact lens in accordance with claim 2, wherein the posterior surface of the central zone is at least partially configured to topographically engage the cornea of an eye.

4. A contact lens in accordance with claim 2, wherein the posterior surface of the central zone is not configured to topographically engage the cornea of an eye.

5. A contact lens in accordance with claim 1, wherein a plurality of contact lens posterior surface meridians converge to yield a spatially symmetric edge.

6. A contact lens in accordance with claim 1, wherein a plurality of contact lens anterior surface meridians are independent of the plurality of contact lens posterior meridians.

7. A contact lens in accordance with claim 1, wherein the lens has at least one annular zone that has a posterior meridional transition profile defined by a third order polynomial.

8. A contact lens in accordance with claim 1, wherein the lens has at least one annular zone that has a posterior meridional transition profile defined by a conic constant.

9. A contact lens in accordance with claim 1, wherein the lens has at least one annular zone having a radius of curvature shorter than that of the central zone.

10. A contact lens in accordance with claim 1, wherein the lens has at least one annular zone that is uncurved and defined by an angle.

11. A contact lens, comprised of at least one annular zone having a sagittal elevation difference between at least two points located the same radial distance from the center axis of the lens, wherein a perimeter of the lens lies within a single plane and is circular.

12. A contact lens in accordance with claim 11, wherein the anterior surface of the lens is spatially symmetric and without aberration.

13. A contact lens in accordance with claim 11, further comprising at least twelve semi-meridians, each of which has an independently configured radial transition.

14. A contact lens comprising:
a central zone, an annular zone, and an edge reconciliation zone,
wherein the annular zone comprises:
a first semi-meridian and a second semi-meridian, wherein a first radial transition of the first semi-meridian differs from a second radial transition of the second semi-meridian; and
wherein a perimeter of the lens lies within a single plane and is circular.

15. A contact lens in accordance with claim 14, wherein the rotational transition from said first semi-meridian to said second semi meridian is defined by a third order polynomial, a conic constant, or is uncurved and defined by an angle.

16. A contact lens comprising:
a central zone, a first annular zone, a second annular zone, and an edge reconciliation zone,
wherein the lens is a soft contact lens;
wherein the posterior surface of the central zone is not configured to spatially match the topography of the cornea;
wherein the first annular zone is configured to engage at least one topographical aberration on the surface of at least one of the cornea and sclera;
wherein the second annular zone is configured for corneal reshaping; and
wherein a perimeter of the lens lies within a single plane and is circular and is configured to rest at or near the limbal junction.

17. A method of making a lens comprising:
obtaining at least one of corneal and scleral elevation data
selecting the radius of curvature of a central zone based upon the obtained elevation data;
applying spline mathematics or other curve fitting methods to the obtained elevation data to define a lens annular zone comprised of a plurality of posterior lens radial meridional transitions and at least one rotational transition between said plurality of posterior lens radial meridional transitions; and
cutting a lens from a pre-formed lens button or blank using a lathe, wherein the lens comprises said lens central zone and said lens annular zone, and wherein a perimeter of the lens lies within a single plane and is circular.

18. A kit comprising a plurality of lenses for use in fitting a plurality of eyes having geometric diversity over at least one of their respective corneal and scleral regions,
wherein each of said plurality of lenses is comprised of at least one annular zone having a sagittal elevation difference between at least two points located the same radial distance from the center axis of the lens,
wherein a perimeter of the lens lies within a single plane and is circular, and
wherein each of said plurality of lenses comprises at least one of a different posterior surface profile and central zone geometry to allow fitting said plurality of eyes.

19. A kit in accordance with claim 18, wherein each of said plurality of lenses has an outer diameter of from about 7 mm to about 24 mm.

* * * * *